US008045839B2

(12) United States Patent
Nishizawa

(10) Patent No.: US 8,045,839 B2
(45) Date of Patent: Oct. 25, 2011

(54) METHOD OF CONTROLLING THE OPERATION OF AN OPTICAL DISC RECORDING APPARATUS, AND RECORDING MEDIUM ON WHICH THE CONTROL PROGRAM IS RECORDED

(75) Inventor: Shin Nishizawa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 835 days.

(21) Appl. No.: 10/607,338

(22) Filed: Jun. 26, 2003

(65) Prior Publication Data

US 2004/0071454 A1    Apr. 15, 2004

(30) Foreign Application Priority Data

Jun. 28, 2002    (JP) ............................... P.2002-190635

(51) Int. Cl.
*H04N 9/80* (2006.01)
*H04N 5/92* (2006.01)
*G11B 11/00* (2006.01)
*G11B 17/04* (2006.01)
*G11B 17/08* (2006.01)

(52) U.S. Cl. ..... 386/239; 386/248; 386/326; 369/13.24; 369/13.26; 369/186; 369/195; 369/199; 369/200

(58) Field of Classification Search ................. 347/225; 386/125–126, 95, 103–106, 239, 248, 326; 369/284, 13.24, 13.26, 189, 195, 199–200
See application file for complete search history.

(56) References Cited

U.S. PATENT DOCUMENTS

| 6,560,407 B2 * | 5/2003 | Maruyama et al. ............. 386/95 |
| 7,015,939 B2 * | 3/2006 | Honda et al. .................. 347/225 |
| 7,331,055 B2 * | 2/2008 | Onodera et al. ............... 720/718 |
| 2001/0026531 A1 | 10/2001 | Onodera et al. |
| 2001/0040867 A1 | 11/2001 | Onodera et al. |
| 2002/0191517 A1 * | 12/2002 | Honda et al. ................. 369/53.29 |
| 2003/0194214 A1 * | 10/2003 | Anderson et al. ............... 386/95 |

FOREIGN PATENT DOCUMENTS

| JP | 06-036514 | 2/1994 |
| JP | 2001-283470 | 10/2001 |
| JP | 2002-288836 | 10/2002 |
| JP | 2003-051118 | 2/2003 |

OTHER PUBLICATIONS

Japanese Patent Office, "Notification of Reasons for Refusal", (re Japanese Patent Application No. 2002-190635) dated Oct. 15, 2007.
Japanese Patent Office, "Decision of Refusal", (re Japanese Patent Application No. 2002-190635) dated Oct. 15, 2007.
Japanese Patent Office, "Decision to Grant", (re Japanese Patent Application No. 2002-190635) dated Oct. 15, 2007.

* cited by examiner

*Primary Examiner* — Thai Tran
*Assistant Examiner* — Daquan Zhao
(74) *Attorney, Agent, or Firm* — Pillsbury Winthrop Shaw Pittman LLP

(57) ABSTRACT

On a host computer (300), writing software for controlling recording and image forming operations of an optical disc recording apparatus (10) is installed. When the writing software is activated, the host computer (300) requests the user to input various settings relating to record information and image information before giving instructions for starting recording and those for starting image formation to the optical disc recording apparatus (10), and, in accordance with various settings which are input in response to the request, determines the recording and image forming operations of the optical disc recording apparatus (10).

17 Claims, 11 Drawing Sheets

FIG. 3A  <RECORDING FACE>
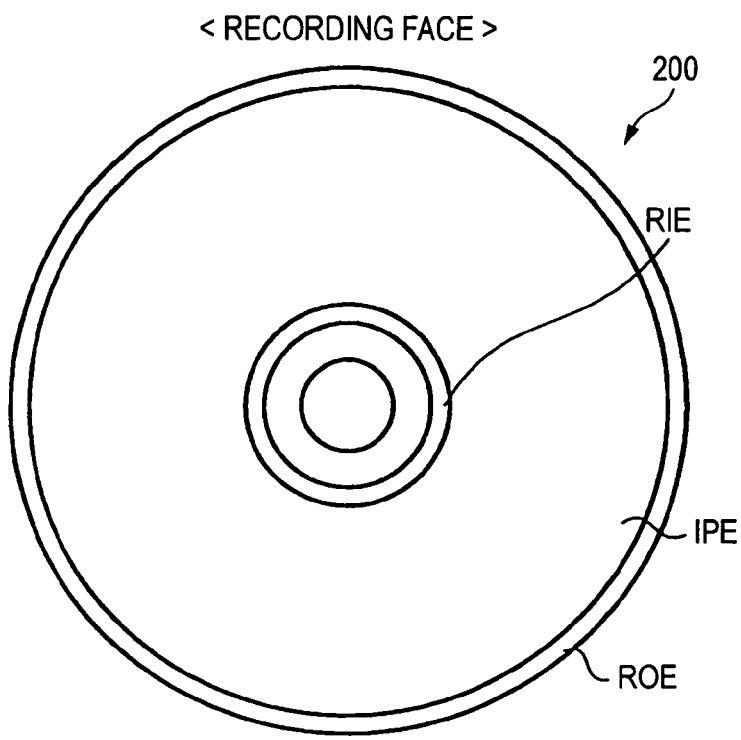
FIG. 3B  <RECORDING FACE>
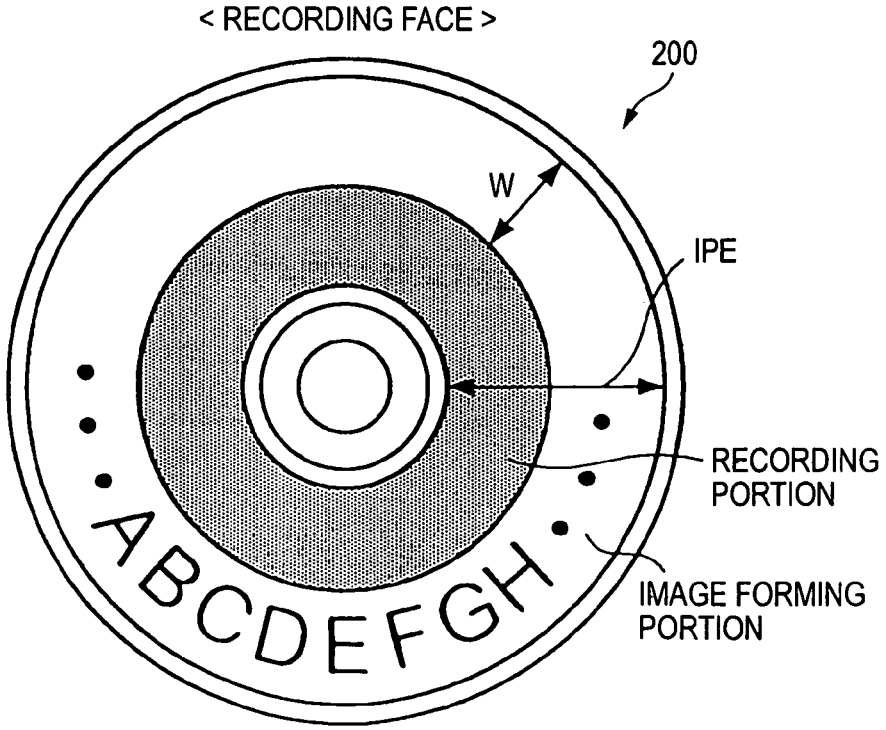

FIG. 12

Information amount is excessively large, and recording and image information are disabled.
Select one of resetting mode and automatic editing mode.

Resetting mode

Automatic editing mode

FIG. 13

Select one of record information preference editing mode and image information preference editing mode.

Record information preference editing mode

Image information preference editing mode

METHOD OF CONTROLLING THE OPERATION OF AN OPTICAL DISC RECORDING APPARATUS, AND RECORDING MEDIUM ON WHICH THE CONTROL PROGRAM IS RECORDED

BACKGROUND OF THE INVENTION

The present invention relates to a method of controlling the operation of an optical disc recording apparatus which can form an image on an optical disc, and a recording medium on which the control program is recorded.

Recently, optical discs on which information can be recorded, such as a CD-R (Compact Disc Recordable) and a CD-RW (Compact Disc Rewritable) are widely used to provide excellent convenience.

When user's original music data which is stored in a personal computer (hereinafter, abbreviated to "PC") is to be recorded onto an optical disc, for example, the user operates a keyboard or the like of the PC to activate writing software (software for recording music data or the like onto an optical disc) stored in a hard disc drive, and selects music data to be recorded.

When such operations are conducted, the music data to be recorded is sequentially transferred from the PC to an optical disc recording apparatus. In the optical disc recording apparatus, on the basis of the music data supplied from the PC, a laser beam is applied to an optical disc loaded into the apparatus, whereby the desired music data is recorded onto the optical disc.

Recently, the user can enjoy oneself by producing an optical disc with full originality as described above. However, thus produced optical discs are hardly distinguished from one another by appearance. When the number of thus produced optical discs is increased, therefore, there arise problems that it is difficult to select a desired one from many optical discs, and that many optical discs are hardly managed.

Consequently, an image such as characters, symbols, and the like indicating the title is formed on a face of an optical disc that is opposite to the face (recording face) on which information is to be written, i.e., on a label face, thereby enabling information recorded on the recording face to be identified. Such an image is formed by printing it onto a label sheet with using a printing apparatus or the like, and then applying the label sheet to the label face of the optical disc.

In order to form an image on an optical disc, a printing apparatus is required in addition to an optical disc recording apparatus, and hence the burden on the user is increased.

By contrast, characters, symbols, and the like for identifying an optical disc may be formed without using a printing apparatus, or for example handwritten with using an appropriate writing instrument. In this case, the above-mentioned burden can be reduced. However, handwriting on a label face causes problems such as that characters or patterns gradually fade to become unclear or spoil the appearance.

SUMMARY OF THE INVENTION

The invention has been conducted in view of the above-described circumstances. It is an object of the invention to provide a method of controlling the operation of an optical disc recording apparatus which can form a visible image on an optical disc, and a recording medium on which the control program is recorded.

In order to solve the aforesaid object, the invention is characterized by having the following arrangement.

Aspect 1. A method of controlling an operation of an optical disc recording apparatus capable of recording record information onto an optical disc and forming an image corresponding to image information on the optical disc, the method comprising the steps of:
  determining an operation of recording the record information by the optical disc recording apparatus and an operation of forming the image corresponding to the image information by the optical disc recording apparatus; and
  giving instructions for starting recording of the record information and instructions for starting formation of the image corresponding to the image information to the optical disc recording apparatus after the determining step.

Aspect 2. The method according to the aspect 1, wherein in the determining step, the operation of recording the record information is determined after the operation of forming the image is determined.

Aspect 3. A method of controlling an optical disc recording system capable of displaying information on a display, and recording record information and forming an image on an optical disc, the method comprising the steps of:
  urging an user to determine the record information to be recorded on the optical disc and the image to be formed on the optical disc;
  displaying on the display a optical disc information reflecting the record information and the image which are determined by the user; and
  recording the determined record information on the optical disc and forming the determined image on the optical disc after the displaying step.

Aspect 4. The method according to the aspect 3, wherein the optical disc information includes a preview display reflecting the determined record information and the determined imaged.

Aspect 5. The method according to the aspect 3 further comprising a step of urging the user to determine whether the recording and forming step is to be executed based on the optical disc information.

Aspect 6. A computer readable recording medium storing a program for causing a computer for controlling an optical disc recording apparatus capable of recording information onto an optical disc and forming an image corresponding to image information on the optical disc, to execute:
  an operation determining step of determining an operation of recording the record information by the optical disc recording apparatus and an operation of forming the image corresponding to the image information by the optical disc recording apparatus; and
  an instructing step of giving instructions for starting recording of the record information and instructions for starting formation of the image corresponding to the image information to the optical disc recording apparatus after the operation determining step.

Aspect 7. The computer readable recording medium according to the aspect 6, wherein the program further causes the computer to execute a notifying function of requesting an input of setting information which is necessary for determining the recording operation and the image forming operation by the optical recording apparatus, and
  wherein the operation determining step includes a step of determining the operation of recording the record information and determining the operation of forming the image in accordance with the input setting information before the instructing step.

Aspect 8. The computer readable recording medium according to the aspect 7, wherein the program further causes the computer to execute: a first obtaining step of obtaining an information amount of designated record information and an information amount of designated image information, and a notifying function of notifying the information amounts of the information which are obtained by the first obtaining function, and wherein setting information includes at least record file information for designating record information and image file information for designating image information.

Aspect 9. The computer readable recording medium according to the aspect 7, wherein the program further causes the computer to execute:
a first obtaining step of obtaining an information amount of designated record information and an information amount of designated image information;
a second obtaining step of obtaining a free area of the optical disc; and
a notifying step of comparing a total of the information amounts of the information which are obtained in the first obtaining step with the free area which is obtained in the second obtaining step, and, when the total of the information amounts is larger than the free area, notifying that the total of the information amounts is larger than the free area, and wherein the setting information includes at least record file information for designating record information and image file information for designating image information.

Aspect 10. The computer readable recording medium according to the aspect 6, wherein the program further causes the computer to execute:
a first obtaining step of obtaining an information amount of designated record information and an information amount of designated image information;
a second obtaining step of obtaining a free area of the optical disc; and
an editing function of editing the information in accordance with a result of comparison between the information amounts of the information obtained in the first obtaining step, and the free area obtained in the second obtaining step, and wherein the setting information includes at least record file information for designating record information, and image file information for designating image information.

Aspect 11. The computer readable recording medium according to the aspect 10, wherein the editing step includes a step of editing the information when the total of the information amounts of the information is larger than the free area as a result of the comparison between the information amounts of the information obtained in the first obtaining step and the free area obtained in the second obtaining function.

Aspect 12. The computer readable recording medium according to the aspect 10, wherein the editing step includes a function of editing only one of the recording information and the image information when the total of the information amounts of the information is larger than the free area as a result of the comparison between the information amounts of the information obtained in the first obtaining step and the free area obtained in the second obtaining step.

Aspect 13. The computer readable recording medium according to the aspect 7, wherein the setting information includes pattern information which indicates a pattern of an image formation corresponding to the image information and to be formed by the optical disc recording apparatus.

Aspect 14. The computer readable recording medium according to the aspect 10, wherein the setting information includes pattern information which indicates a pattern of an image formation corresponding to the image information and to be formed by the optical disc recording apparatus.

BRIEF DESCRIPTION OF THE DRAWINGS

FIGS. 3A and 3B are diagrams illustrating the format of an optical disc in the embodiment.

FIG. 12 is a view showing an example of a message which is displayed on a display unit in the embodiment.

FIG. 13 is a view showing another example of a message which is displayed on a display unit in the embodiment.

DETAILED DESCRIPTION OF PREFERRED EMBODIMENTS

Hereinafter, an embodiment in which the invention is applied to an optical disc recording apparatus which can record various information onto an optical disc, and which can form a desired image on the optical disc will be described.

A. Embodiment (1) Configuration of the Embodiment

Figure 1:
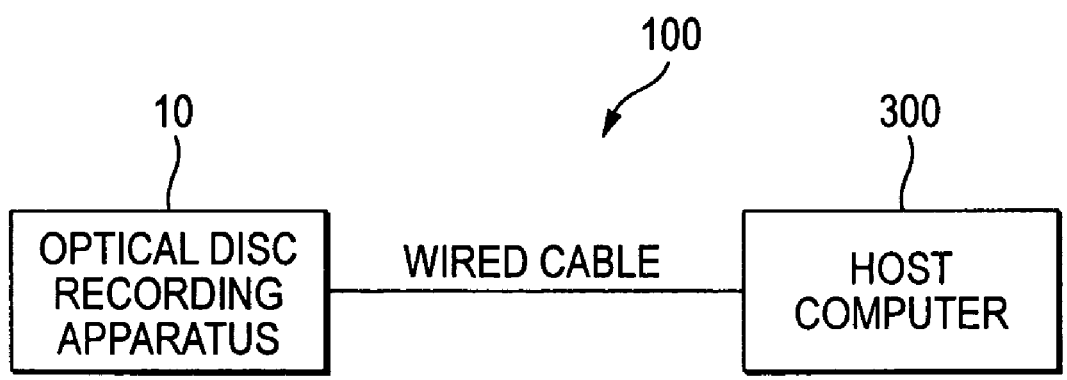
FIG. 1 is a diagram schematically showing the configuration of an optical disc recording system in an embodiment.

FIG. 1 is a diagram schematically showing the configuration of an optical disc recording system 100 according to the embodiment.

As shown in FIG. 1, the optical disc recording system 100 includes: a host computer 300; and an optical disc recording apparatus 10 which, in accordance with instructions given from the host computer 300, records information onto an optical disc 200 and forms an image on the optical disc 200. Although FIG. 1 shows an example in which the host computer 300 and the optical disc recording apparatus 10 are connected to each other via a wired cable (such as an RS232C cable or a USB cable), it is a matter of course that the connection can be realized by a wireless system (such as Bluetooth), or the recording apparatus may be installed in the host computer 10.

<Configuration of the Optical Disc Recording Apparatus 10>

Figure 2:
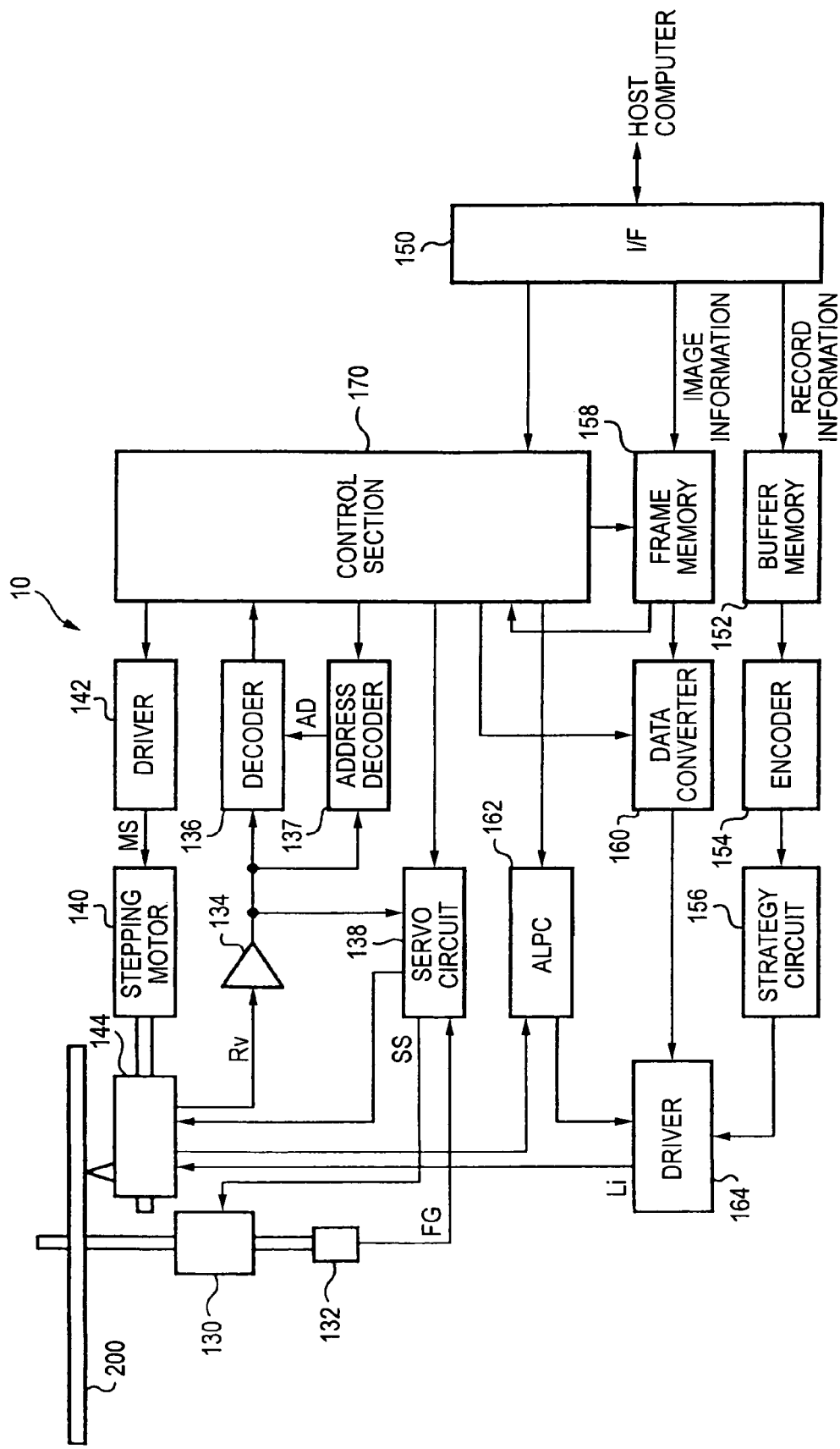
FIG. 2 is a block diagram showing the configuration of main portions of the optical disc recording apparatus in the embodiment.

FIG. 2 is a block diagram showing the configuration of main portions of the optical disc recording apparatus 10 according to the embodiment, and FIG. 3 is a diagram illustrating the format of the optical disc 200.

The optical disc 200 is a disc-like recording medium such as a CD-R or a CD-RW, and has a recording face and a label face. As described above, usually, an image such as characters, symbols, and the like indicating the title is formed on a label face. In the embodiment, contrarily, such an image is formed on the recording face. This will be described in detail. As shown in FIG. 3A, an information recording/image forming area IPE where information recording and image formation can be performed is prepared in the recording face of the optical disc 200.

In accordance with record information (such as music data) and image information (such as image data in the bitmap format) which are sequentially supplied from the host computer 300, the optical disc recording apparatus 10 applies a laser beam to the information recording/image forming area IPE in the recording face of the optical disc 200, to record the desired record information onto the optical disc 200, and form a desired image on the optical disc 200 (see FIG. 3B).

Referring back to FIG. 2, a spindle motor 130 is a section which rotates the optical disc 200. Based on a control signal SS supplied from a servo circuit 138, the spindle motor rotates the optical disc 200.

A rotation detector 132 is a section which detects the rotation speed of the spindle motor 130, and, while using the counter electromotive force of the spindle motor 130, supplies an FG signal of a frequency corresponding to the rotation speed of the spindle motor 130, to the servo circuit 138.

Under the control by a main control section 170, the servo circuit 138 generates the control signal SS on the basis of the FG signal supplied from the rotation detector 132, and supplies the control signal to the spindle motor 130, thereby implementing the rotation control on the spindle motor 130 (hereinafter, referred to as "spindle servo"). In the embodiment, the CAV system in which information recording and image formation are performed while controlling the rotation number of the spindle motor 130 so as to be constant is employed. Therefore, the servo circuit 138 conducts a feedback control so that the rotation speed of the spindle motor 130 detected from the FG signal coincides with an angular velocity which is instructed by the main control section 170. The servo circuit 138 conducts other servo controls including a focusing servo control (a servo control for focusing the laser beam) on an optical pickup 144, and a tracking servo control (a servo control for tracing a track where pits are formed), in addition to the spindle servo.

The optical pickup 144 includes a laser diode, a four-split photodetector, and an objective lens actuator (which are not shown), and applies the laser beam to the optical disc 200 to record music data or the like and form an image such as characters of a title in accordance with record information and image information supplied from the host computer 300.

A stepping motor 140 moves the optical pickup 144 in a radial direction of the optical disc 200 in accordance with a motor drive signal MS supplied from a motor driver 142.

According to instructions from the main control section 170, the motor driver 142 generates the motor drive signal MS for moving the optical pickup 144 in the instructed direction and by the instructed distance, and supplies the signal to the stepping motor 140.

An RF amplifier 134 amplifies a photodetection signal Rv which is generated by a light receiving device (not shown) of the optical pickup 144. The amplified signal is supplied to a decoder 136, an address decoder 137, and the servo circuit 138.

The address decoder 137 detects a track address in the optical disc 200 from the photodetection signal Rv supplied from the RF amplifier 134, and supplies the detected address data AD to the decoder 136.

The decoder 136 receives the photodetection signal Rv supplied from the RF amplifier 134, and the address data AD supplied from the address decoder 137, EFM (Eight to Fourteen Modulation)-demodulates audio data and the like contained in the photodetection signal Rv in synchronization with the address data AD, and supplies the demodulated data to the main control section 170. When content information, i.e., TOC (Table Of Contents) data written on the optical disc 200 is read out in the data reproduction, the decoder 136 decodes the TOC data, and supplies the decoded TOC data to the main control section 170.

The main control section 170 is configured by a CPU, a ROM, a RAM, and the like, and executes various control programs stored in the ROM to control various portions of the optical disc recording apparatus 10.

An ALPC (Automatic Laser Power Control) circuit 162 controls the power of the laser beam applied by the optical pickup 144. The ALPC circuit 162 controls the current level of a drive signal Li so that the light intensity of the laser beam emitted from the optical pickup 144 coincides with the target value of the optimum laser power which is instructed by the main control section 170.

A buffer memory 152 stores record information which is supplied from the host computer 300 via an interface 150, and which is to be recorded onto the optical disc 200, in the form of a FIFO.

An encoder 154 EFM-modulates the record information which is read out from the buffer memory 152, and supplies the modulated information to a strategy circuit 156. The strategy circuit 156 conducts a time base correcting process and the like on the EFM signal supplied from the encoder 154, and supplies the processed signal to a laser driver 164.

A frame memory 158 stores image information which is supplied from the host computer 300 via the interface 150, and which corresponds to an image to be formed on the optical disc 200.

A data converter 160 converts the image information which is read out from the frame memory 158, to laser intensity information, and sequentially supplies the laser intensity information to the laser driver 164. The laser intensity information is information indicating whether the laser intensity is set to the write level (a laser intensity which is sufficient for discoloring a heat-sensitive layer of the optical disc 200) or to the bottom level (a laser intensity by which the heat-sensitive layer of the optical disc 200 is not discolored).

The laser driver 164 generates the drive signal Li in which the control contents of the ALPC circuit 162 are reflected, in accordance with the record information which is sequentially supplied from the buffer memory 152 via the encoder 154 and the strategy circuit 156, and the image information which is sequentially supplied from the frame memory 158 via the data converter 160. The generated drive signal is supplied to the optical pickup 144. The intensity of the laser beam emitted from the optical pickup 144 is feedback-controlled so as to coincide with the target value supplied from the main control section 170.

<Configuration of the Host Computer 300>

Figure 4:
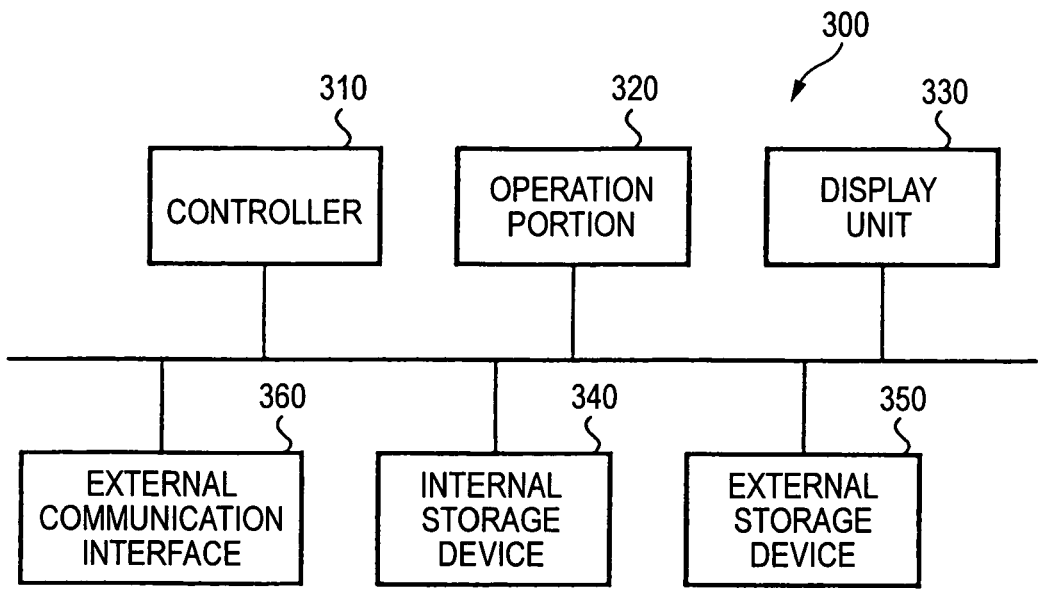
FIG. 4 is a block diagram showing the configuration of main portions of a host computer in the embodiment.

FIG. 4 is a block diagram showing the configuration of main portions of the host computer 300.

The host computer 300 is configured by a well-known PC and the like, and comprises writing software for controlling the recording and image forming operations of the optical disc recording apparatus 10 (the software will be described later).

A controller 310 is configured by a CPU, a ROM, a RAM, and the like, and, when various control programs stored in the ROM are activated, centrally controls various portions of the host computer 300.

An operation unit 320 is configured by various operating devices such as a keyboard and a mouse. The user can adequately operate the operating devices to select record information which is to be recorded onto the optical disc 200, and image information corresponding to an image which is to be formed on the optical disc 200, and input instructions such as those for starting recording of the selected record information, and starting formation of an image corresponding to the selected image information.

A display unit 330 is configured by a liquid crystal panel and the like, displays a setting screen for requesting setting of the recording and image forming operations of the optical disc recording apparatus 10, and previously conducts a display (a so-called preview display) for showing areas of the optical disc 200 where the record information is to be recorded and the image corresponding to the image information is to be formed (the display will be described in detail later).

An internal storage device 340 is configured by a hard disc drive or the like, and stores the above-mentioned writing software, various record information and image information, etc.

Figure 5:
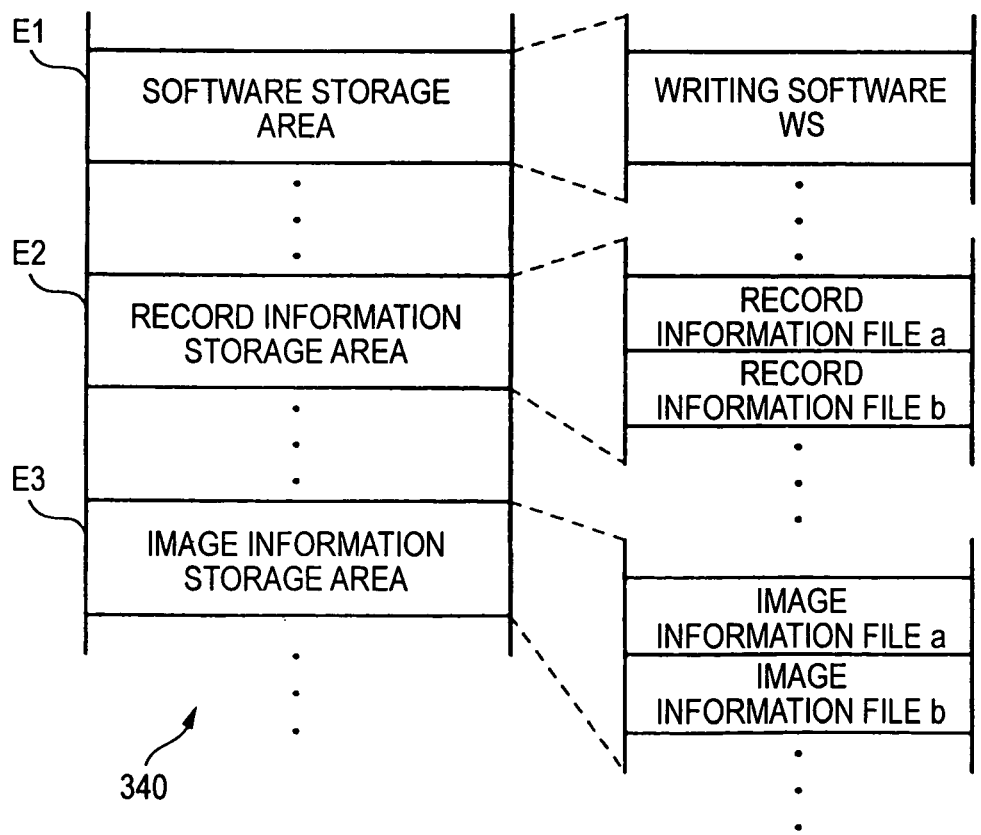
FIG. 5 is a diagram showing the stored contents in an internal storage device in the embodiment.

FIG. 5 is a diagram showing the stored contents in the internal storage device 340.

The internal storage device 340 has plural storage areas such as a software storage area E1, a record information storage area E2, and an image information storage area E3.

The software storage area E1 stores plural kinds of software including the writing software WS.

The record information storage area E2 stores plural record information (such as music data) which are recordable onto the optical disc 200 (see a record information file a and a record information file b which are shown in FIG. 5).

The image information storage area E3 stores plural image information (such as data in the bitmap format) which can be formed on the optical disc 200 (see an image information file a and an image information file b which are shown in FIG. 5). In the embodiment, an assumed case where plural image information are previously stored in the image information storage area E3 will be described. Alternatively, for example, character data or the like which are transferred from an external storage device 350 may be converted to data in the bitmap format, and the converted data may be adequately stored as image information into the image information storage area E3.

The external storage device 350 is configured by a floppy disc drive or the like, and, in accordance with instructions from the controller 310, sequentially transfers record information, image information, and like information which are recorded on a recording medium such as a floppy disc, to the internal storage device 340.

An external communication interface 360 is connected to the optical disc recording apparatus 10 by the wired cable to supply and receive record information, image information, and like information to and from the optical disc recording apparatus 10.

The optical disc recording system 100 in the embodiment is configured as described above. Hereinafter, the operation of the optical disc recording system 100 will be described.

(2) Operation of Embodiment

The user who wishes to record desired record information and form a desired image on the optical disc 200 sets the optical disc 200 so that the recording face of the optical disc 200 is opposed to the optical pickup 144.

Then, the user adequately operates the mouse or the like of the host computer 300 to input instructions for activating the writing software WS stored in the internal storage device 340. Upon receiving the instructions via the operation unit 320, the controller 310 of the host computer 300 activates the writing software WS. Then, the controller 310 displays on the display unit 330 a recording operation/image forming operation setting screen IPS that is exemplarily shown in FIG. 6, to request the user to input information (setting information) which is necessary for determining the recording operation and the image forming operation by the optical disc recording apparatus 10.

Figure 6:
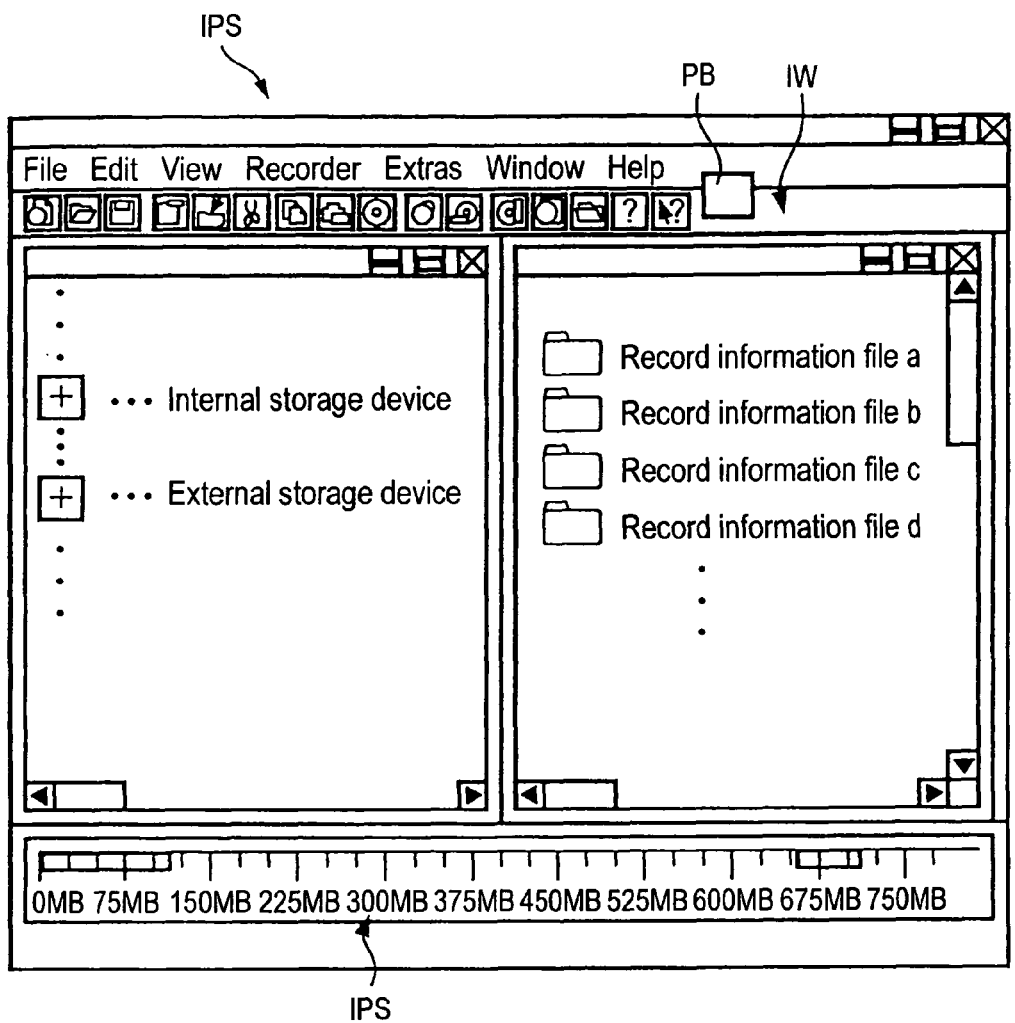
FIG. 6 is a view showing an example of a recording operation/image forming operation setting screen in the embodiment.

As shown in FIG. 6, a recording operation setting window IW, an image forming operation setting button PB, a disc capacity display bar CB, and the like are displayed on the recording operation/image forming operation setting screen IPS.

Locations where record information are stored, and names of a plurality of record information files which are stored in the locations are displayed in the recording operation setting window IW. More specifically, when the user operates the mouse or the like to select a storage location, the names of record information files stored in the storage location are displayed.

The image forming operation setting button PB is used for displaying an image forming operation setting window PW (which will be described later). When the user operates the mouse to click on the image forming operation setting button PB, the image forming operation setting window PW which will be described later is displayed.

The disc capacity display bar CB shows the capacity of the optical disc 200. When record information to be recorded and image information corresponding to an image to be formed are selected by operating the mouse, the controller 310 obtains the information amounts of each of the selected record information and image information, and the information amounts of the information are displayed in the disc capacity display bar CB.

In the embodiment, the case where record information is recorded in the inner peripheral side of the optical disc 200, and an image corresponding to image information is formed in the outer peripheral side of the optical disc 200 will be described. When record information to be recorded and image information corresponding to an image to be formed are selected, therefore, the information amount IM1 of the record information is displayed in a free area portion corresponding to the inner peripheral side of the optical disc 200, and the information amount IM2 of the image information is displayed in a free area portion corresponding to the outer peripheral side of the optical disc 200.

For example, the free area of the optical disc 200 may be obtained by requesting the user to input the free area of the optical disc 200, or by giving instructions for checking the free area of the optical disc 200 and reporting a result of the check, to the optical disc recording apparatus 10.

When the recording operation/image forming operation setting screen IPS is displayed on the display unit 330, the user operates the mouse to select a storage location of record information and the file name of the record information.

Figure 7:
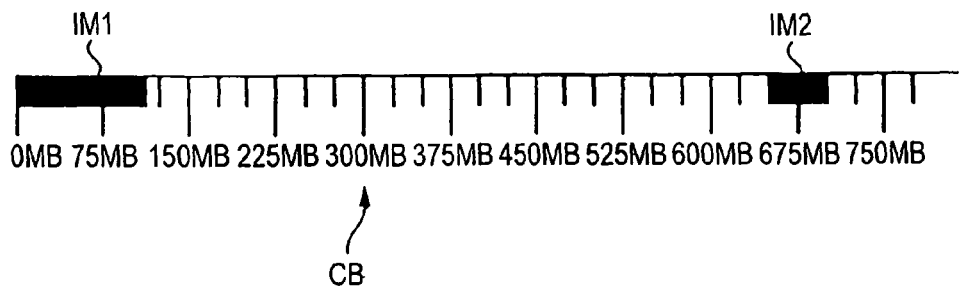
FIG. 7 is a view showing a disc capacity display bar in the embodiment.

When the operation is conducted, the controller 310 specifies the record information (for example, record information file a) selected by the user among plural record information stored in the storage location (for example, the internal storage device) which is selected by the user. The controller 310 then reads the header and the like attached to the record information to obtain the information amount of the record information, displays the information amount in the disc capacity display bar CB (see the information amount IM1 shown in FIG. 7), and displays a message to request an input of information which is necessary for determining the image forming operation, on the display unit 330.

When the user reads the message, the user operates the mouse to click on the image forming operation setting button PB. As a result of the mouse click, the image forming operation setting window PW is displayed on the display unit 330 (see FIG. 8).

Figure 8:
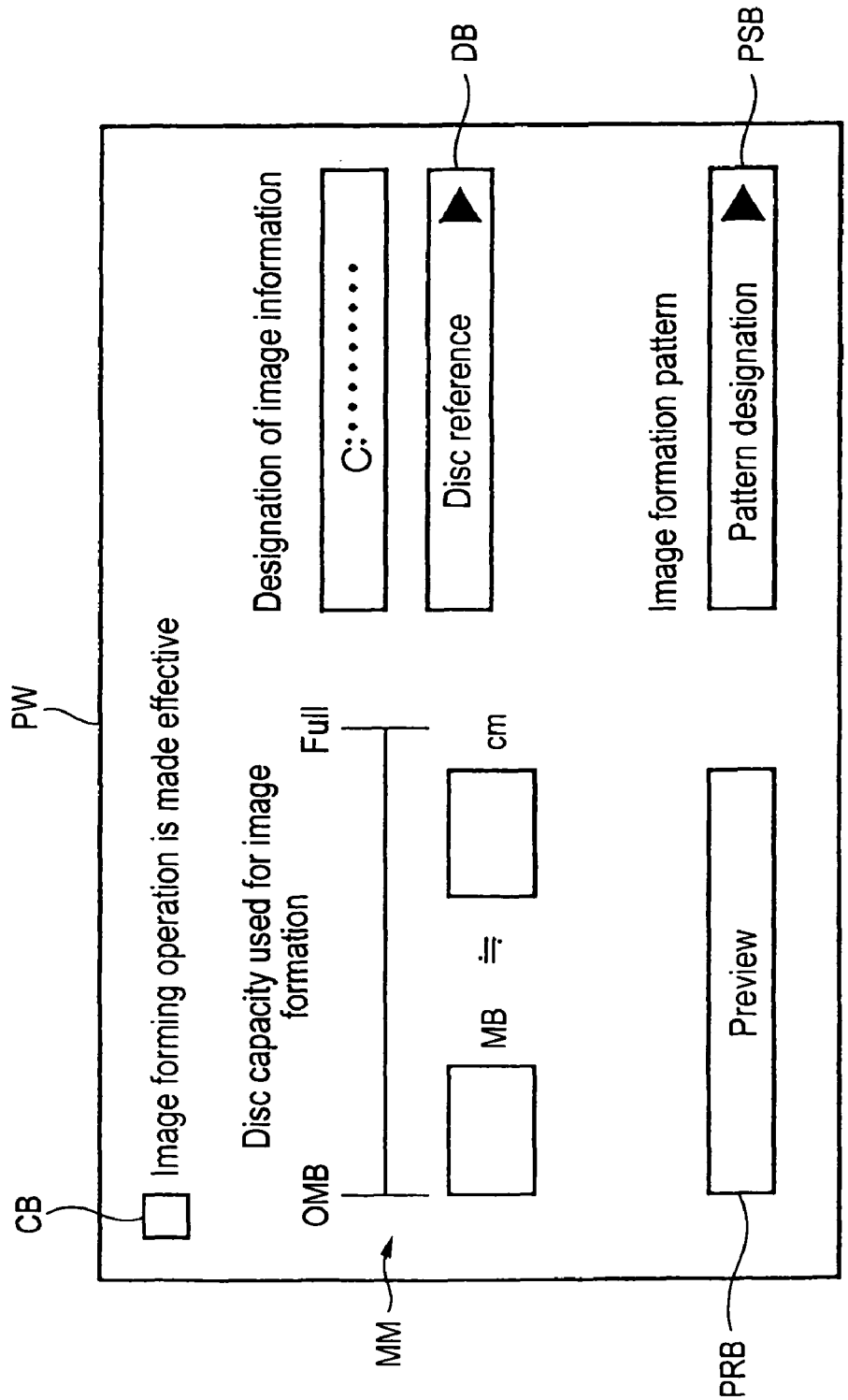
FIG. 8 is a view exemplarily showing an image forming operation setting window in the embodiment.

As shown in FIG. 8, in the image forming operation setting window PW, displayed are an image formation check box CB for requesting the user to determine whether the image forming operation is made effective or not, a disc reference button DB for selecting image information, a pattern designation button PSB for designating a pattern in which an image corresponding to selected image information is to be formed, an image information amount message MM which indicates the information amount and the like of the selected image information, a preview button PRB for showing a preview display of a state where the selected record information is recorded and an image corresponding to the selected image information is formed on the optical disc 200, etc.

Figure 9:
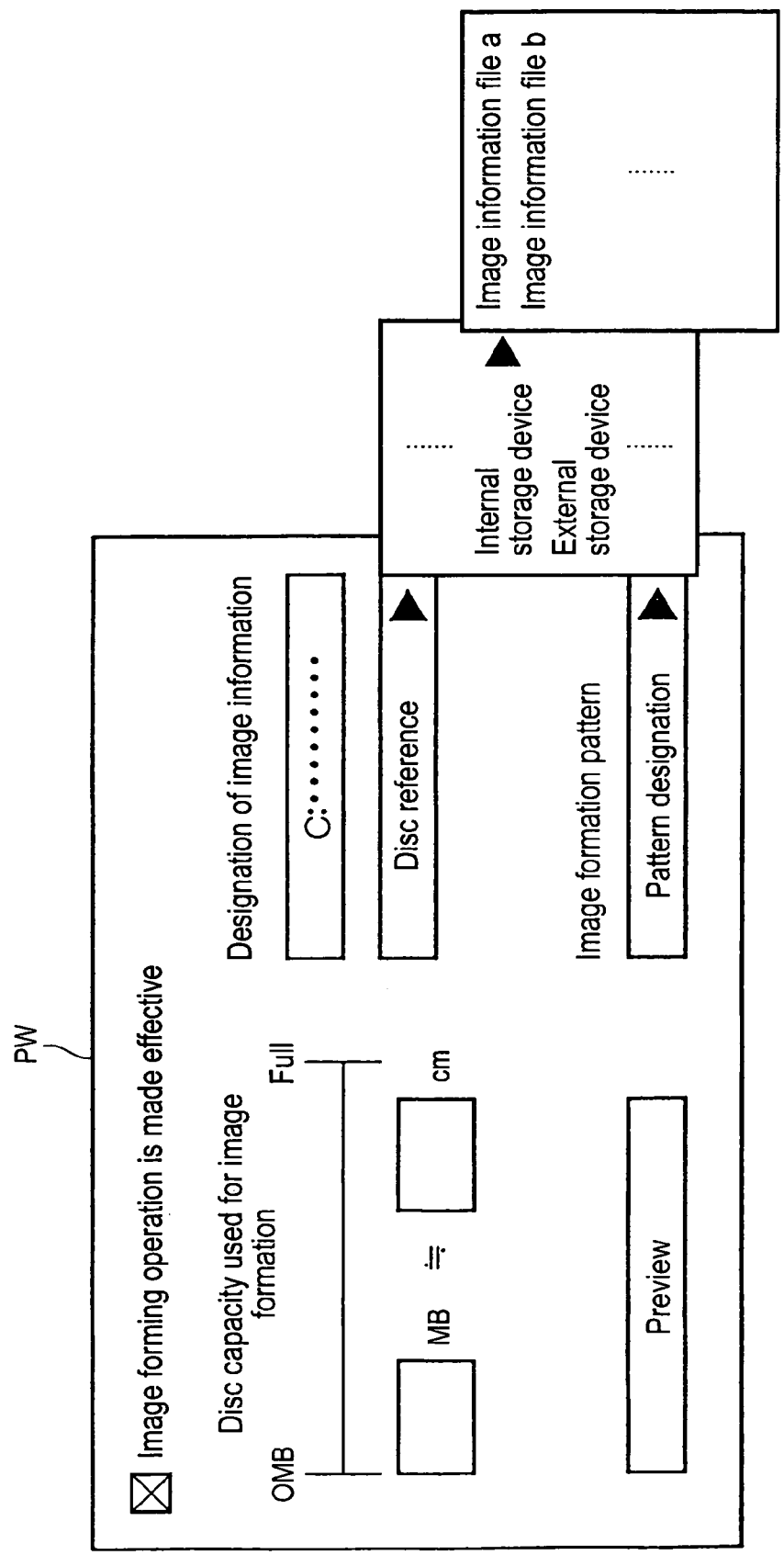
FIG. 9 is a view exemplarily showing the image forming operation setting window in the embodiment.

After the user selects the image formation check box CB to enable the image forming operation, the user further operates the mouse to click on the disc reference button DB. As a result of the operation, a pull-down list showing locations (the internal storage device and the like) where various image information are stored is displayed below the disc reference button DB (see FIG. 9). The user specifies one of the plural storage locations shown in the list, and further specifies the image information (for example, image information file a) corresponding to the image to be formed, among plural image information stored in the specified storage location.

Figure 10:
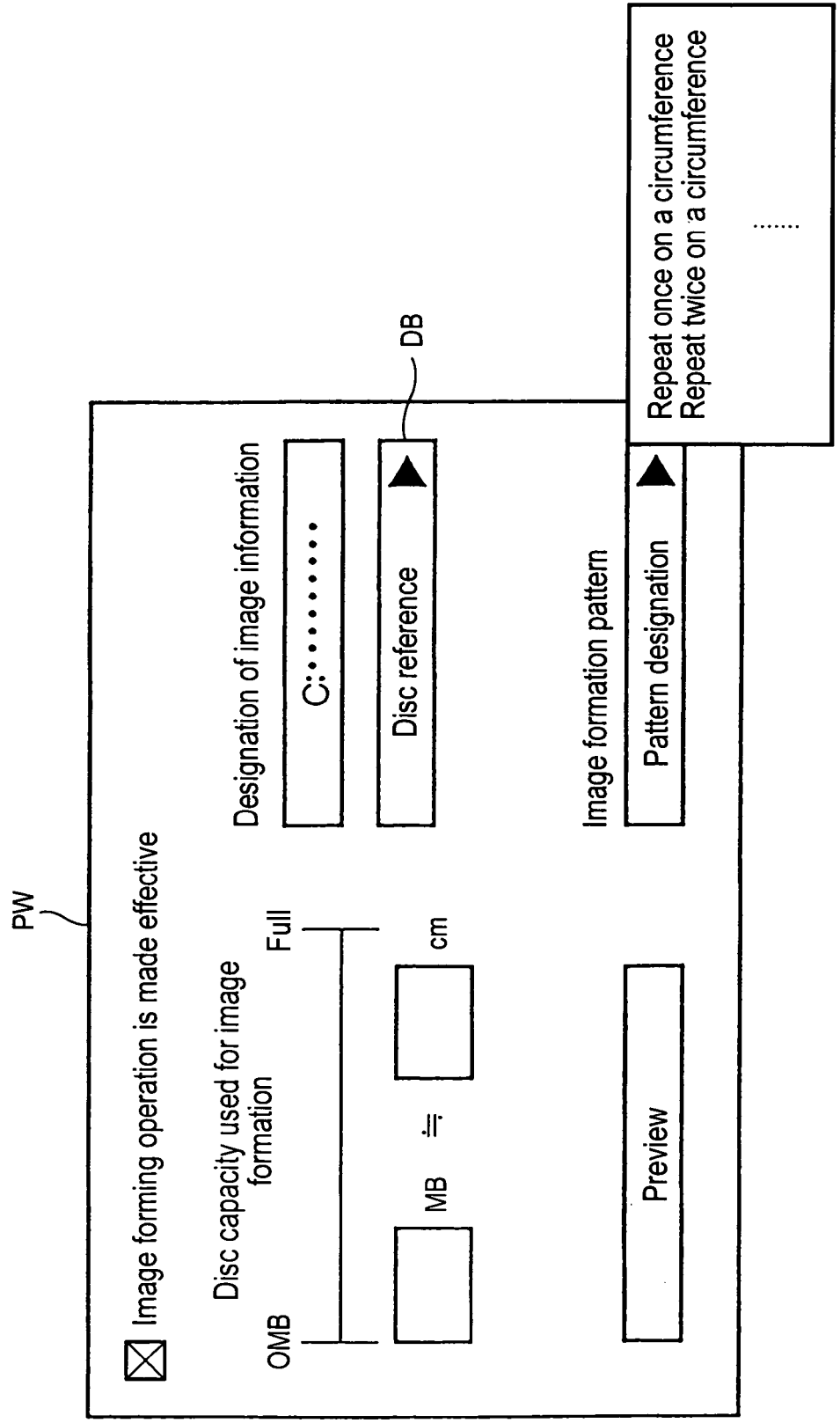
FIG. 10 is a view exemplarily showing the image forming operation setting window in the embodiment.

The user then clicks on the pattern designation button PSB. As a result of the operation, a pull-down list showing various patterns (for example, repetition on a circumference) is displayed below the pattern designation button PSB (see FIG. 10). In the same manner as described above, the user operates the mouse to specify an image pattern to be formed, among the plural patterns shown in the list.

When the above-described operations are conducted, the controller 310 reads the header and the like of the image information selected by the user to obtain the information amount of the image information, and also the information amount (for example, 30 MB) in the case where the image corresponding to the image information is formed on the optical disc 200 in the selected pattern. On the basis of the obtained information amount of the image information, the controller 310 obtains the radial width W (for example, 2.4 cm) in the optical disc 200 which is required for forming the image (see FIG. 3B). The controller 310 displays the information amount of the image information and the radial width W in the optical disc 200 which are obtained as described above, on the display unit 330 (see FIG. 11), and displays the information amount of the image information in the disc capacity display bar CB (see the information amount IM2 of the image information shown in FIG. 7).

In the above, the example in which the total of the obtained information amounts of record information and image information is not larger than the free area of the optical disc 200 has been described. A case where the total of the obtained information amounts of record information and image information is larger than the free area of the optical disc 200 may occur. In such a case, the controller 310 displays a message such as shown in FIG. 12 on the display unit 330 to notify the user that the total of the obtained information amounts of record information and image information is larger than the free area of the optical disc 200, and request the user to select one of a resetting mode and an automatic editing mode.

When the user operates the mouse to select the resetting mode, the controller 310 initializes all the contents which have been set (the selection of record information, that of image information, and the like), and again displays the recording operation/image forming operation setting screen IPS shown in FIG. 6, on the display unit 330.

The user reselects record information and image information so that the total of the information amounts of the record information and the image information is not larger than the free area of the optical disc 200. In the above, when the user selects the resetting mode, all the contents which have been set are initialized. Alternatively, only part of the set contents may be initialized. When only the set contents of record information are initialized, for example, only contents relating to record information may be reset.

By contrast, when the user operates the mouse to select the automatic editing mode, the controller 310 displays a message such as shown in FIG. 13 on the display unit 330 to request the user to select one of a record information preference editing mode and an image information preference editing mode. The record information preference editing mode is an automatic editing mode in which only the set contents relating to image information are changed without changing those relating to record information. The image information preference editing mode is an automatic editing mode in which only the set contents relating to record information are changed without changing those relating to image information.

When the user operates the mouse to select the record information preference editing mode, the controller 310 changes the set contents relating to image information so that the total of the information amounts of the record information and the image information is not larger than the free area of the optical disc 200. Specifically, image information is edited, for example, by changing the image pattern or the size of the image so that the information amount of image information is reduced.

By contrast, when the user operates the mouse to select the image information preference editing mode, the controller 310 changes the set contents relating to record information so that the total of the information amounts of the record information and the image information is not larger than the free area of the optical disc 200. Specifically, record information is edited, for example, by deleting part of the record information (e.g., by deleting record information of one music piece).

In the case where the automatic editing mode is selected by a mouse operation or the like, there is the possibility that record information or image information which is not intended by the user is deleted or changed. In order to obtain the confirmation of the user before deletion or the like of record information or image information, a message such as "File XX is deleted, and automatic edition is conducted. OK?" may be displayed on the display unit 330. Only when the user agrees to the message, the automatic edition may be enabled.

In the embodiment, as described above, when the total of the information amounts of record information and image information is larger than the free area of the optical disc 200, the record information or the image information is automatically edited. Alternatively, record information or image information may be edited irrespective of whether the total of the information amounts of the record information and the image information is larger than the free area of the optical disc 200 or not. An example of the alternative will be described. When the total of the information amounts of record information and image information is extremely smaller than the free area of the optical disc 200, the information or the image information is edited so that the total of the information amounts of the record information and the image information substantially coincides with the free area of the optical disc 200. The edition of record information or image information is approximately identical with that described above, and hence its detailed description is omitted. In the embodiment, in accordance with the selected editing mode, only one of image information and record information is automatically edited. Alternatively, for example, a batch editing mode may be used so that both record information and image information are automatically edited.

Figure 11:
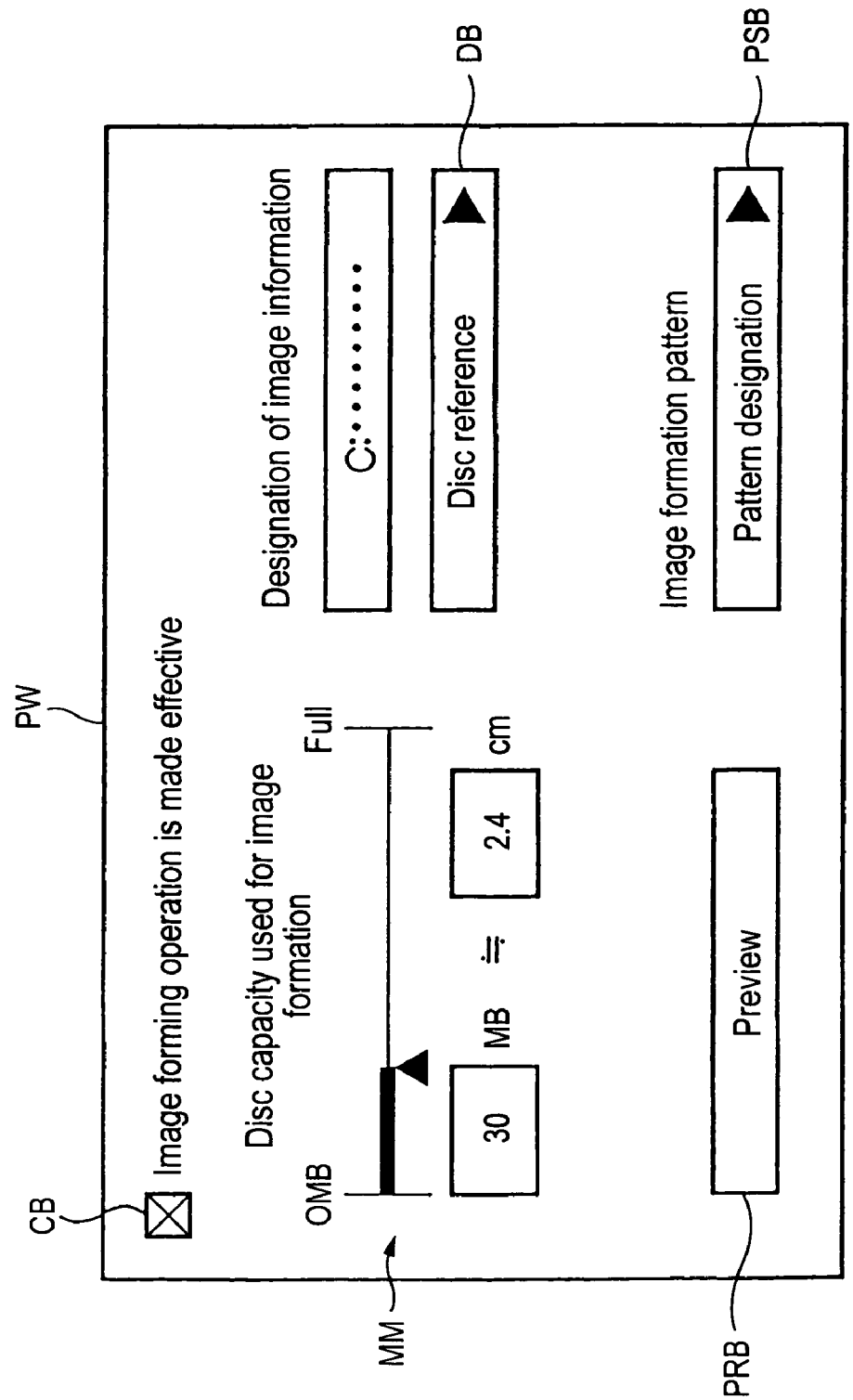
FIG. 11 is a view exemplarily showing the image forming operation setting window in the embodiment.

Returning to the description of the embodiment, when the setting relating to record information and image information is ended, the user operates the mouse to click on the preview button PRB shown in FIG. 11. As a result of the operation, the controller 310 displays on the display unit 330 a preview display showing a state where the record information is recorded and an image corresponding to the image information is formed on the optical disc 200.

Figure 14:
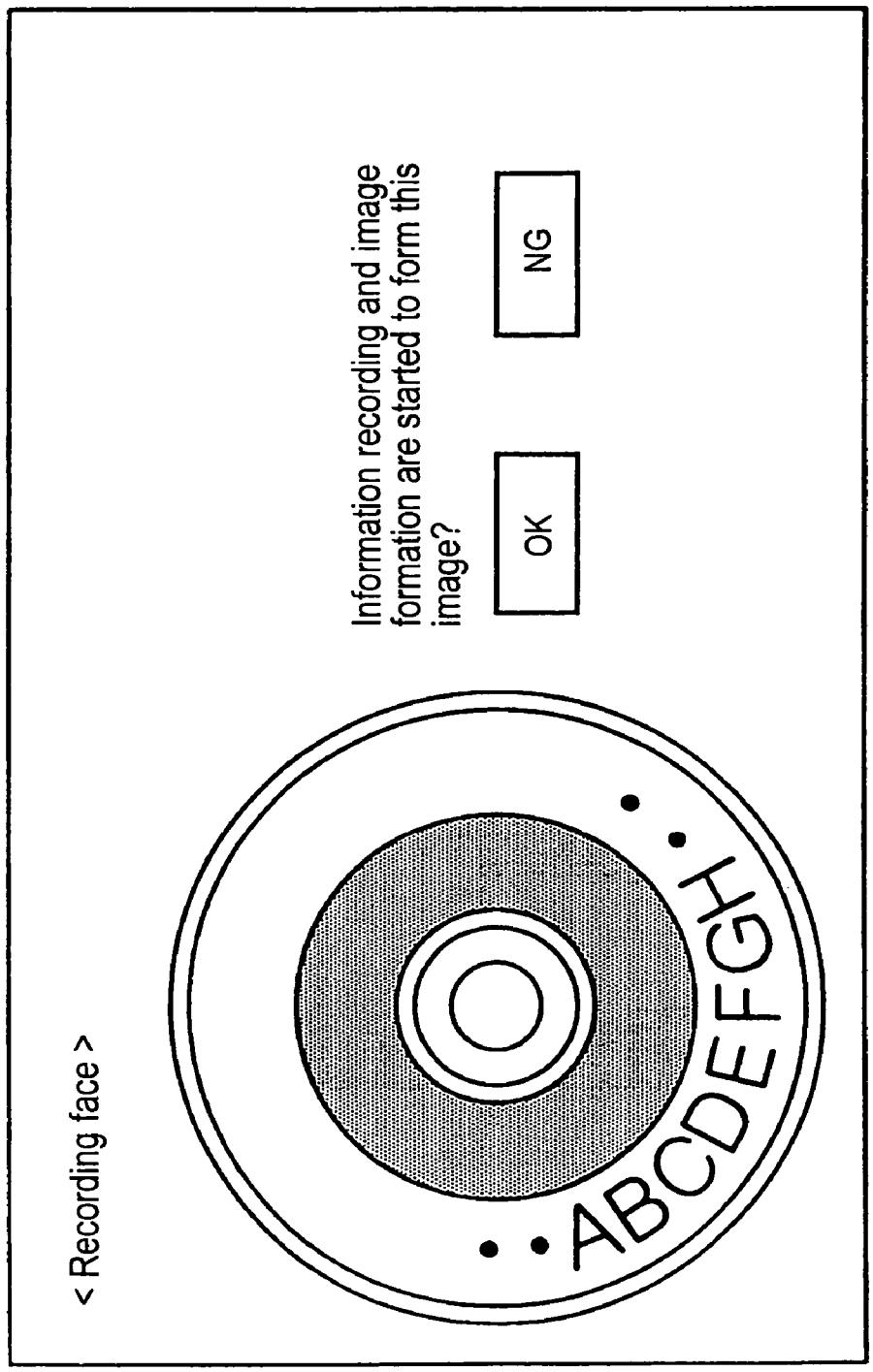
FIG. 14 is a view showing an example of a preview display screen in the embodiment.

FIG. 14 is a view showing an example of a preview display screen.

As shown in FIG. 14, an optical disc on which record information is recorded and an image corresponding to image information is formed is displayed in the left side of the preview display screen. A message to request an input of instructions for starting recording of the record information and formation of the image corresponding to the image information is displayed in the right side of the preview display screen.

The user checks the size, arrangement, and the like of the image which is displayed in the left side of the preview display screen, and which will be formed on the optical disc 200, and determines whether recording of the record information and formation of the image corresponding to the image information are to be started under this state or not. If the user determines that recording of the record information and formation of the image corresponding to the image information are to be started under this state, the user clicks on an OK button which is displayed in the right side of the preview display screen.

By contrast, if the user judges that the image which will be formed on the optical disc 200 is smaller than one expected, or that the arrangement of the image is not adequate, the user clicks on an NG button which is displayed in the right side of the preview display screen. When the NG button is clicked, for example, the controller 310 again displays the recording operation/image forming operation setting screen IPS shown in FIG. 6, on the display unit 330 in order to request the user to reset record information and image information. Operations after the display of the recording operation/image forming operation setting screen IPS on the display unit 330 are approximately identical with those described above, and hence their detailed description is omitted.

When the OK button is clicked and instructions for starting recording of the record information and formation of the image corresponding to the image information are given, the controller 310 sends instructions for starting recording of the record information under the set contents, and formation of the image corresponding to the image information under the set contents, to the optical disc recording apparatus 10. The controller 310 then starts to supply the record information and the image information to the optical disc recording apparatus 10.

In the optical disc recording apparatus 10, the record information and the image information which are sequentially supplied from the host computer 300 are stored into the buffer memory 152 and the frame memory 158, respectively. When instructions for starting recording of record information, and those for starting formation of an image corresponding to image information are given from the host computer 300, the optical disc recording apparatus 10 first starts recording of record information in accordance with the instructions.

Specifically, the optical pickup 144 is moved to the innermost periphery of the optical disc 200, and recording of record information by the optical pickup 144 is then started. When recording of record information which is sequentially supplied from the host computer 300 is then completed, the optical disc recording apparatus 10 implements a finalization process. This process will be described in detail. TOC data (such as the final record address) relating to record information which have been recorded are written into a lead-in area RIE of the optical disc 200 shown in FIG. 3A, and the end of data is written between the completion position of the record information and a lead-out area ROE.

Thereafter, the optical disc recording apparatus 10 starts formation of an image corresponding to image information. Specifically, referring to the TOC data written into the lead-in area RIE of the optical disc 200, the apparatus specifies the initial address where the image formation is to be started. The optical disc recording apparatus 10 moves the optical pickup 144 to the initial address, and controls the optical pickup 144 to start the formation of an image corresponding to image information. When the image forming operation by the optical pickup 144 corresponding to image information is then ended, the apparatus notifies the host computer 300 that recording of record information and formation of an image corresponding to image information are completed, and then terminates the process.

As a result, as shown in FIG. 3B, record information is recorded onto the optical disc 200, and an image corresponding to image information is formed on the optical disc 200. The light reflectivity of the portion where the image is formed is different from that of the portion where the image is not formed. Because of the difference in reflectivity, the user can recognize the image formed on the optical disc 200.

As described above, according to the optical disc recording system 100 in the embodiment, a visible image can be formed on the optical disc 200 without additionally requiring another apparatus such as a printing apparatus.

The writing software WS installed on the host computer 300 requests the user to set various settings relating to record information and image information before giving the optical disc recording apparatus 10 instructions for starting recording of the record information and those for starting formation of an image corresponding to the image information, and determines the recording and image forming operations of the optical disc recording apparatus 10 in accordance with various settings which are input in response to the request.

As described above, various settings relating to record information, and those related to image information can be simultaneously conducted, and hence the setting operation can be simplified.

Since various settings relating to record information and image information are conducted before recording of the record information and formation of an image corresponding to the image information are started, the problems such as that a total of information amounts of the record information and the image information exceeds the free area of the optical disc 200 and a desired image is not formed on the optical disc 200 can be prevented from occurring.

In the embodiment, the record information preference editing mode in which the set contents relating to image information are changed without changing those relating to record information, and the image information preference editing mode in which the set contents relating to record information are changed without changing those relating to image information are prepared as an automatic editing mode in which record information and image information are automatically edited.

Therefore, it is possible to satisfy needs of both the user who wishes to process image information in preference to record information, and one who wishes to process record information in preference to image information.

B. Modifications

The invention is not restricted to the embodiment described above, and can be modified in the following exemplary manners.

<Modification 1>

In the embodiment described above, record information is recorded in the inner peripheral side of the optical disc 200, and an image corresponding to image information is formed in the outer peripheral side. Conversely, an image corresponding to image information may be formed in the inner peripheral side of the optical disc 200, and record information may be recorded in the outer peripheral side. As well known in the art, in an optical disc recording apparatus in which the CAV system is employed, the linear velocity in the inner peripheral side is larger than that in the outer peripheral side. The recording accuracy requested in the inner peripheral side is higher than that requested in the outer peripheral side. Therefore, information recording in which a higher accuracy is required is conducted in the outer peripheral side, and image formation in which the accuracy is not required to be very high is conducted in the inner peripheral side. In this way, the recording position and the image formation position may be adequately set in accordance with the requested recording accuracy or the like.

<Modification 2>

In the embodiment, the optical disc recording apparatus 10 in which the CAV system is employed has been exemplarily described. Alternatively, the invention can be applied to the optical disc recording apparatus 10 in which any recording system such as the partial CAV system or the CLV system is employed. Although the embodiment which uses a CD-R or a CD-RW has been described, the invention can be applied to an optical disc of any kind, such as a DVD-R (Digital Versatile Disc Recordable) or a DVD-RAM (Digital Versatile Disc Random Access Memory).

<Modification 3>

In the above, the embodiment in which the host computer 300 and the optical disc recording apparatus 10 are separately configured has been described. Alternatively, the host computer 300 and the optical disc recording apparatus 10 may be integrally configured. In the embodiment described above, the writing software WS is previously installed on the host computer 300. Alternatively, the writing software WS may be installed on the host computer 300 from a recording medium (for example, a floppy disc) on which the writing software is recorded, or the writing software may be installed on the host computer 300 by downloading the writing software from a server having the writing software via a network (e.g., the Internet). In this way, the writing software WS of the embodiment may be installed on the host computer 300 via various kinds of media.

As described above, according to the invention, a visible image can be formed on the optical disc 200 without additionally requiring another apparatus such as a printing apparatus.

What is claimed is:

1. A method of controlling an operation of an optical disc recording apparatus operable for recording record information onto a recording face of an optical disc and forming an image corresponding to image information on the recording face, the method comprising:

determining both an area of the optical disc at which the record information is to be recorded by the optical disc recording apparatus and an area of the optical disc at which the image corresponding to the image information is to be formed by the optical disc recording apparatus before recording the record information and forming the image;

displaying, on a display, optical disc information reflecting the record information and the image, which are determined by the user, on the determined areas, respectively, wherein the optical disc information includes a preview display reflecting the determined record information and the determined image; and giving instructions for starting recording of the determined record information and instructions for starting formation of the determined image corresponding to the image information to the optical disc recording apparatus after the displaying step, wherein the determined record information is recorded on the recording face of the optical disc and automatically in succession thereafter the determined image is formed on the recording face of the optical disc by applying a laser beam.

2. The method according to claim 1, wherein in the determining step, the operation of recording the record information is determined after the operation of forming the image is determined.

3. A method of controlling an optical disc recording system operable for displaying information on a display, and recording record information and forming an image on an optical disc, the method comprising:

urging a user to determine the record information to be recorded on the optical disc and the image to be formed on the optical disc before recording the recording information and forming the image;

displaying on the display optical disc information reflecting the record information and the image which are determined by the user; and recording the determined record information on the optical disc and forming the determined image on the optical disc after the displaying step, wherein the determined record information is recorded on the recording face of the optical disc and automatically in succession thereafter the determined image is formed on the recording face of the optical disc by applying a laser beam, and the optical disc information includes a preview display reflecting the determined record information and the determined image.

4. The method according to claim 3 further including urging the user to determine whether the recording and forming step is to be executed based on the optical disc information.

5. A computer-implemented method for controlling an optical disc recording apparatus operable for recording information onto a recording face of an optical disc and forming an image corresponding to image information on the recording face, the method comprising:

an operation determining step of determining both an area of the optical disc at which the record information is to be recorded by the optical disc recording apparatus and an area of the optical disc at which the image corresponding to the image information is to be formed by the optical disc recording apparatus before recording the record information and forming the image;

displaying, on a display, optical disc information reflecting the record information and the image which are determined by the user on the determined areas, respectively, wherein the optical disc information includes a preview display reflecting the determined record information and the determined imaged; and an instructing step of giving instructions for starting recording of the record information and instructions for starting formation of the image corresponding to the image information to the optical disc recording apparatus after the displaying step, wherein the determined record information is recorded on the recording face of the optical disc and automatically in succession thereafter the determined image is formed on the recording face of the optical disc by applying a laser beam.

6. The computer-implemented method according to claim 5, further including requesting an input of setting information for determining the recording operation and the image forming operation by the optical recording apparatus, and wherein the operation determining step includes determining the operation of recording the record information and determining the operation of forming the image in accordance with the input setting information before the instructing step.

7. The computer-implemented method according to claim 6, further including a first obtaining step of obtaining an information amount of designated record information and an information amount of designated image information, and a notifying function of notifying the information amounts of the information which are obtained by the first obtaining function, and wherein setting information includes at least record file information for designating record information and image file information for designating image information.

8. The computer-implemented method according to claim 6, further including:

a first obtaining step of obtaining an information amount of designated record information and an information amount of designated image information;

a second obtaining step of obtaining a free area of the optical disc; and a notifying step of comparing a total of the information amounts of the information which are obtained in the first obtaining step with the free area which is obtained in the second obtaining step, and, when the total of the information amounts is larger than the free area, notifying that the total of the information amounts is larger than the free area, and wherein the setting information includes at least record file information for designating record information and image file information for designating image information.

9. The computer-implemented method according to claim 6, wherein the setting information includes pattern information which indicates a pattern of an image formation corresponding to the image information and to be formed by the optical disc recording apparatus.

10. The computer-implemented method according to claim 5, further including:

a first obtaining step of obtaining an information amount of designated record information and an information amount of designated image information;

a second obtaining step of obtaining a free area of the optical disc; and an editing function of editing the information in accordance with a result of comparison between the information amounts of the information obtained in the first obtaining step, and the free area obtained in the second obtaining step, and wherein the setting information includes at least record file information for designating record information, and image file information for designating image information.

11. The computer-implemented method according to claim 10, wherein the editing step includes a step of editing the information when the total of the information amounts of the information is larger than the free area as a result of the comparison between the information amounts of the information obtained in the first obtaining step and the free area obtained in the second obtaining function.

12. The computer-implemented method according to claim 10, wherein the editing step includes a step of editing only one of the recording information and the image information when the total of the information amounts of the information is larger than the free area as a result of the comparison between the information amounts of the information obtained in the first obtaining step and the free area obtained in the second obtaining step.

13. The computer-implemented method according to claim 10, wherein the setting information includes pattern information which indicates a pattern of an image formation corresponding to the image information and to be formed by the optical disc recording apparatus.

14. A method of controlling an optical disc recording system operable for displaying information on a display, and recording record information and forming an image on an optical disc, the method comprising:

urging a user to determine the record information to be recorded on the optical disc and the image to be formed on the optical disc;

determining both an area of the optical disc at which the record information is to be recorded by the optical disc recording apparatus and an area at which the image corresponding to the image information is to be formed by the optical disc recording apparatus before recording the record information and forming the image;

displaying, on the display, optical disc information reflecting the record information and the image on the determined areas, respectively and recording the determined record information on the optical disc and forming the determined image on the optical disc after the displaying step, wherein the determined record information is recorded on the recording face of the optical disc and automatically in succession thereafter the determined image is formed on the recording face of the optical disc by applying a laser beam.

15. The method according to claim 14, wherein the area at which the image is to be formed is located radially outward and adjacent to the area at which the record information is to be recorded.

16. An optical disc recording system for recording record information onto a recording face of an optical disc and forming an image corresponding to image information on the recording face the optical disc recording system comprising:
- an area determining unit which determines both an area of the optical disc at which the record information is to be recorded and an area of the disc at which the image corresponding to the image information is to be formed before recording the record information and forming the image;
- a display which displays optical disc information reflecting the record information and the image which are determined by the user on the determined areas, respectively, wherein the optical disc information includes a preview display reflecting the determined record information and the determined image; and
- an optical pickup which applies laser beam on the optical disc to automatically record the determined record information and form the determined image corresponding to the image information on the recording face automatically in succession after the area determining unit determines the areas.

17. The system according to claim 16, wherein the area at which the image is to be formed is located radially outward and adjacent to the area at which the record information is to be recorded.

* * * * *